United States Patent
Ishikawa (10) Patent No.: US 7,328,632 B2
(45) Date of Patent: Feb. 12, 2008

(54) WAVE GEAR DRIVE HAVING WIDELY ENGAGING TOOTH PROFILE

(75) Inventor: Shoichi Ishikawa, Yokohama (JP)

(73) Assignee: Harmonic Drive Systems Inc., Tokyo (JP)

( * ) Notice: Subject to any disclaimer, the term of this patent is extended or adjusted under 35 U.S.C. 154(b) by 178 days.

(21) Appl. No.: 10/570,998

(22) PCT Filed: May 26, 2004

(86) PCT No.: PCT/JP2004/007168

§ 371 (c)(1),
(2), (4) Date: Mar. 6, 2006

(87) PCT Pub. No.: WO2005/043006

PCT Pub. Date: May 12, 2005

(65) Prior Publication Data
US 2007/0022838 A1    Feb. 1, 2007

(30) Foreign Application Priority Data
Oct. 30, 2003 (JP) ............ 2003-369934

(51) Int. Cl.
*F16H 33/00* (2006.01)
(52) U.S. Cl. ....................................... 74/640
(58) Field of Classification Search ............ 74/640
See application file for complete search history.

(56) References Cited
U.S. PATENT DOCUMENTS

| | | | |
|---|---|---|---|
| 2,906,143 A | 9/1959 | Musser | |
| 4,823,638 A | 4/1989 | Ishikawa | |
| 4,974,470 A * | 12/1990 | Ishikawa et al. | 74/640 |
| 5,687,620 A | 11/1997 | Ishikawa | |
| 5,782,143 A | 7/1998 | Ishikawa | |
| 5,918,508 A | 7/1999 | Ishikawa | |
| 6,167,783 B1 * | 1/2001 | Ishikawa | 74/640 |
| 6,230,587 B1 * | 5/2001 | Grill | 74/640 |
| 6,526,849 B1 | 3/2003 | Ishikawa | |
| 6,799,489 B2 * | 10/2004 | Ishikawa | 74/640 |
| 7,147,583 B2 * | 12/2006 | Lemanski | 475/164 |

FOREIGN PATENT DOCUMENTS

| | | |
|---|---|---|
| JP | 45-41171 | 12/1970 |
| JP | 63-115943 A | 5/1988 |
| JP | 64-079448 A | 3/1989 |

(Continued)

OTHER PUBLICATIONS

International Search Report dated Jul. 20, 2004.

*Primary Examiner*—Ha D. Ho
(74) *Attorney, Agent, or Firm*—Buchanan Ingersoll & Rooney PC (57) ABSTRACT

A wave gear drive, wherein a rigid internal gear is formed in a spur gear with a module m and a flexible external gear is formed in a conical gear having an opening side front end with a module m. The number of the teeth of the external gear is reduced by the quantity of 2n (n is a positive integer) less than that of the internal gear, and the amount of the deflection of the major axis of the elliptic rim neutral line of the external gear is set to 2 κmn (κ>1) at the opening side front end thereof.

12 Claims, 5 Drawing Sheets

FOREIGN PATENT DOCUMENTS

| | | |
|---|---|---|
| JP | 7-167228 A | 7/1995 |
| JP | 7-293643 A | 11/1995 |
| JP | 9-166186 A | 6/1997 |
| JP | 2001-146945 A | 5/2001 |
| WO | 96/19683 A1 | 6/1996 |

* cited by examiner

WAVE GEAR DRIVE HAVING WIDELY ENGAGING TOOTH PROFILE

RELATED APPLICATION

This application is based on and claims priority to Japanese Application No. 2003-369934, filed on Oct. 30, 2003 and International Application No. PCT/JP2004/007168, filed on May 26, 2004 designating the U.S., the entire contents of both of which are hereby incorporated by reference.

TECHNICAL FIELD

The present invention relates to a high ratcheting torque wave gear drive having a widely engaging tooth profile.

BACKGROUND ART

Since the wave gear drive was invented by C. W. Musser (Patent Reference 1) to the present day, various types of wave gear drives have been invented by many researchers, including Musser and the inventor of the present application. Various inventions have also been proposed relating just to tooth profiles of wave gear drives. For example, the inventors of the present application have proposed making the basic tooth profile an involute tooth profile (Patent Reference 2), and a method of designing a tooth profile in which the addendum profiles for wide contact between the rigid internal gear and the flexible external gear are derived using a rack approximation of the meshing between the two gears (Patent References 3 and 4). There has also been proposed an invention for avoiding interference between rack-approximated tooth profiles (Patent Reference 5).

Patent Reference 1: U.S. Pat. No. 2,906,143
Patent Reference 2: JP 45-41171 B
Patent Reference 3: JP 63-115943 A
Patent Reference 4: JP 64-79448 A
Patent Reference 5: JP 7-167228 A

DISCLOSURE OF THE INVENTION

With wave gear drives, in the case of high reduction ratios in which the number of the teeth of the two gears exceeds, for example, 160, during high torque being applied there is a risk of the phenomenon of tooth-skipping, what is called ratcheting, occurring. However, there is no specific proposal with respect to a tooth profile that can prevent ratcheting while continuously maintaining contact.

In order to prevent ratcheting during high torque, the tooth depth has to be made as large as possible. Also, it is necessary to widen the region of engagement of the rigid internal gear and flexible external gear that are component parts of a wave gear drive, increasing the torque capacity.

In view of the above points, the problem for the present invention is to provide a wave gear drive that in order to prevent ratcheting during high torque being applied, has a tooth profile that enables the tooth depth to be enlarged and, moreover, the engaging region to be widened.

MEANS FOR SOLVING THE PROBLEMS

The present invention solves the above problems in a wave gear drive having a circular rigid internal gear, inside which is disposed a flexible external gear,
inside which a wave generator is inserted, the flexible external gear having a flexible cylindrical body and an annular diaphragm that extends in a radial direction from a back end of the cylindrical body, a tooth portion formed on an opening end side region of the cylindrical body being flexed into an elliptical shape by a deflection amount generated by the wave generator from a back end portion on the diaphragm side to a front end portion on the opening end side thereof that is approximately proportional to distance from the diaphragm,
characterized in that:
the rigid internal gear is a spur gear of module m,
the flexible external gear is a spur gear of module m or a conical gear of module m at the front end portion thereof,
a number of teeth of the flexible external gear is 2n (n being a positive integer) fewer than a number of teeth of the rigid internal gear,
the deflection amount of the major axis of the elliptical rim neutral line of the flexible external gear at a cross-section of the flexible external gear perpendicular to the axis at an arbitrarily selected location in the direction of the tooth trace thereof (hereinafter referred to as main cross-section) is set at 2 κmn (κ>1),
the meshing of the teeth of the rigid internal gear and flexible external gear in the main cross-section is approximated as rack meshing and the moving path of the teeth of the flexible external gear with respect to the teeth of the rigid internal gear that accompanies rotation of the wave generator obtained, from the main axis to a tooth departing side in the moving path, employing a curved portion from a deepest engaged position of the two gears at which an inclination angle of a radial line to the moving path of the rigid internal gear is 90° to the position at which the inclination angle is α(0°<α<30°), employing as a tooth profile of the flexible external gear a first similar curve obtained by enlarging the curved portion by λ times, and
employing as a tooth profile of the rigid internal gear a second similar curve obtained by enlarging the curved portion by (λ+1) times.

For the inclination angle α, generally it is practical to employ a value within the range of from 0° to 15°.

Here, in order to obtain a high ratcheting torque, tooth depth must be made as large as possible. For this, λ is made as large as possible. The λ maximum value is a position on the moving path to which the addendum of the rigid internal gear comes; making λ any larger causes interference between the addenda of the two gears. Therefore, in the present invention, it is desirable to set the value of λ so that the apex of the second similar curve obtained by multiplying the curved portion as the origin of the deepest engaged position by (λ+1) times is positioned on the moving path.

Also, with respect to the extreme value of the maximum value of λ, there are cases in which the addendum of the rigid internal gear is selected as the location of the maximum amplitude of the moving path. In the present invention, therefore, it is desirable to set the values of λ and α so that the apex of the second similar curve obtained by multiplying the curved portion as the origin of the deepest engaged position by (λ+1) times is positioned at the maximum amplitude point of the moving path.

Next, in order to ensure that effective meshing of the two gears can be maintained at a region other than the main cross-section of the flexible external gear, it is desirable to make the main cross-section a cross-section perpendicular to the axis of the front end portion in the direction of the tooth trace of the flexible external gear, set the deflection amount of the back end portion in the direction of the tooth trace of the flexible external gear to 2 κmn (κ<1), and use as the flexible external gear, a equal-depth-tooth conical gear with the minor diameter facing towards the front end portion.

In this case, in order to prevent interference between the addenda of the two gears caused by the amplitude of the moving path of the flexible external gear decreasing from the front end portion to the back end portion in the direction of the tooth trace, it is desirable that at the axial section that includes the major axis of the flexible external gear flexed into an elliptical shape, the tip cylinder surface of the flexible external gear be shaped as a conical surface so that the addenda of the flexible external gear follow the tooth bottoms of the rigid internal gear, with the shape of the tip cylinder surface of the rigid internal gear being formed as a conical surface having an inside diameter that gradually increases from the front end portion to the back end portion in the tooth trace direction.

When the tooth profiles of the two gears are thus formed, the meshing of the two gears at the back end portion in the direction of the tooth trace of the teeth of the flexible external gear is pre-stage meshing up to the position of the major axis of the flexible external gear flexed into an ellipse, and differs from post-stage meshing from past the position of the major axis at the front end portion (main cross-section) in the direction of the tooth trace of the teeth of the flexible external gear. Meshing from the front end portion to the back end portion in the tooth trace direction is intermediate transitional meshing that includes pre-stage meshing and post-stage meshing. Thus, in accordance with the present invention, it is possible to realize wide-area engagement across the major axis.

Next, the present invention is suitable for use in a wave gear drive having a high reduction ratio in which the number of teeth of the two gears is 160 or more.

EFFECT OF THE INVENTION

As described in the foregoing, since in the wave gear drive of the present invention the tooth depth of the teeth of the rigid internal gear and the flexible external gear is related to the deflection amount, the deflection amount in the radial direction of the flexible external gear, preferably the deflection amount of the front end portion on the opening end side thereof, is set at 2 $\kappa$mn ($\kappa$>1) which is larger than the standard deflection amount of 2 mn ($\kappa$=1).

Also, in a case in which $\kappa$>1, continuous contact of the two gears is effected by rack approximating the moving track of the meshing of the teeth of the two gears, and using as the basic tooth profile of both gears a curve that is the curve on the departing side of the post-stage meshing from the deepest engaged position that is the apex of the rack moving path that is similarly enlarged.

Therefore, in accordance with the wave gear drive having a widely engaging tooth profile of the present invention, the deflection amount of the flexible external gear is made larger compared to the case of the usual standard ($\kappa$=1), so the tooth depth can be increased, making it possible to realize high ratcheting torque meshing. Also, continuous meshing over the range of the moving path used to define the tooth profile can be realized, not the momentary kind of meshing such as when a linear tooth profile is used.

In addition, with the present invention, the deflection amount of the back end portion on the diaphragm side of the flexible external gear is set at $\kappa$mn ($\kappa$<1), and wide-area engagement of the two gears can be attained by meshing the two gears even at the pre-stage region that is up until the reaching of the deepest engaged position. At that time, any addendum modifications are performed on the tooth profile of the flexible external gear, and tooth depth in the direction of the tooth trace is adjusted.

The result is that it is possible to realize continuous meshing over a wide range on both sides of the major axis position of the flexible external gear flexed into an ellipse. Thus, in accordance with the present invention, it is possible to further increase the load capability of the wave gear drive.

BEST MODE FOR CARRYING OUT THE INVENTION

A wave gear drive that applies the present invention is described below, with reference to the drawings.

(Configuration of the Wave Gear Drive)

Figure 1:
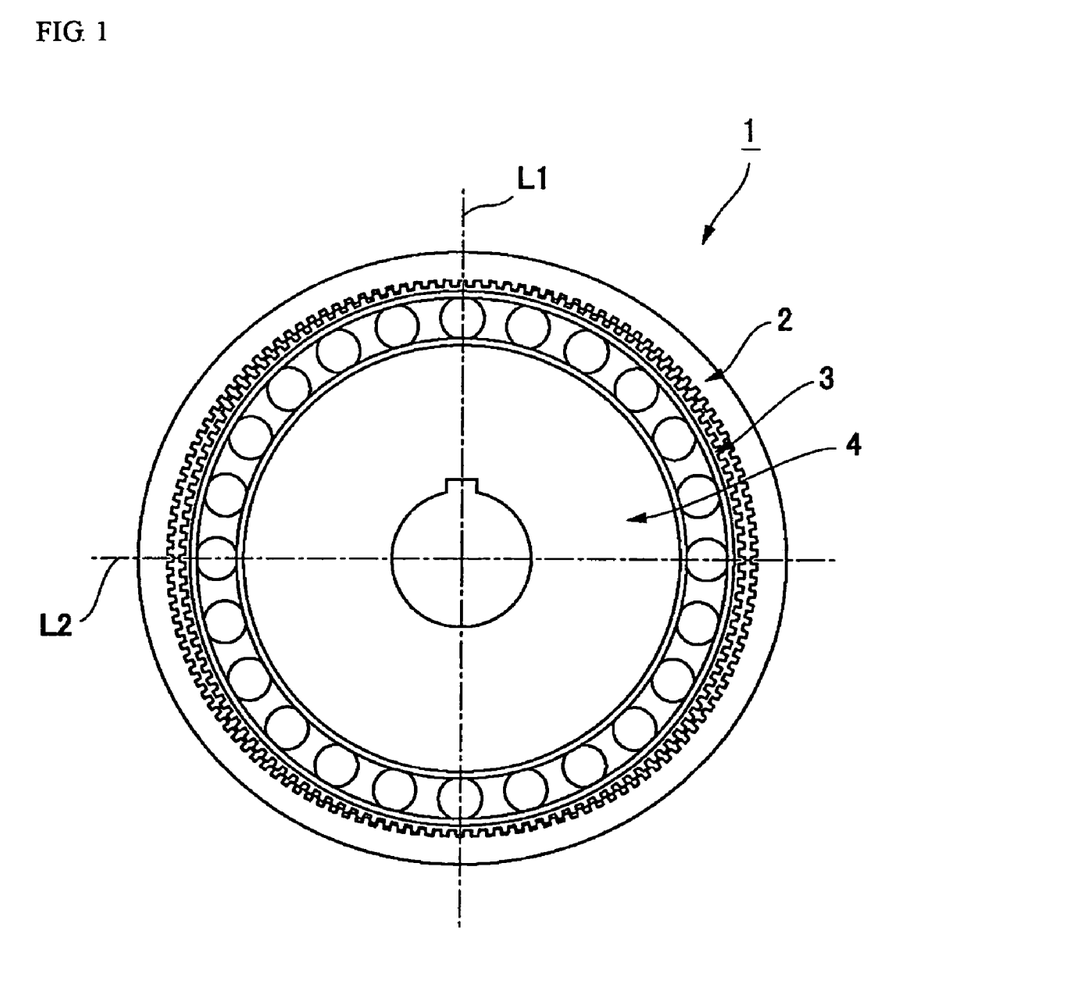
FIG. 1 is a general front view of a wave gear drive that is an object of the present invention.
Figure 2:
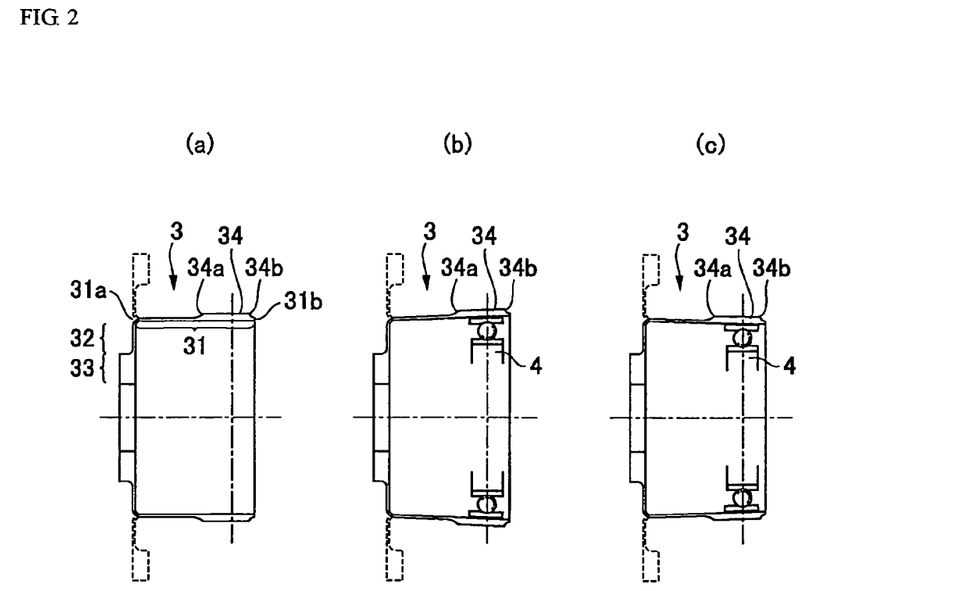
FIG. 2 is an explanatory diagram showing an axial section that includes the flexing condition of the flexible external gear, with (a) showing the state before deformation, (b) an axial section that includes the major axis of the ellipse after deformation, and (c) an axial section that includes the minor axis.

FIG. 1 is a front view of the wave gear drive that is the object of the present invention, FIG. 2 is a cross-sectional diagram showing an axial section that includes the opening portion of the flexible external gear thereof in the condition of being flexed into an elliptical shape, with (a) showing the state before deformation, (b) an axial section that includes the major axis of the ellipse after deformation, and (c) an axial section that includes the minor axis of ellipse after deformation. In addition, in FIG. 2 a solid line shows a cup-shaped flexible external gear, and a broken line shows a silk-hat-shaped flexible external gear.

As shown in these drawings, wave gear drive 1 has a circular rigid internal gear 2, inside which a flexible external gear 3 is disposed, inside which a wave generator 4 is inserted. The difference between the number of teeth of the rigid internal gear 2 and flexible external gear 3 is 2n (n is a positive integer). The flexible external gear 3 of the wave gear drive 1 is flexed into an ellipse by a wave generator 4 having an elliptical profile, engaging with the rigid internal gear 2 at the two end portions in the direction of the major axis L1 of the ellipse. When the wave generator 4 rotates, the position of meshing of the two gears 2, 3 moves circumferentially, generating relative rotation between the two gears 2, 3 that corresponds to the difference in the number of teeth of the two gears. The flexible external gear 3 comprises a flexible cylindrical body 31, a diaphragm 32 expanding radially that is continuous with a back end 31a thereof, a boss 33 that is continuous with the diaphragm 32, and external teeth 34 formed on an outer peripheral surface portion of an opening end 31b side of the cylindrical body 31.

By means of the wave generator 4 having an elliptical profile inserted in the inside peripheral surface portion of the external teeth formation portion of the cylindrical body portion 31, the amount by which the cylindrical body portion 31 is flexed radially inwards or outwards from the back end 31a of the diaphragm side thereof towards the opening end opening end 31b is gradually increased. As shown in FIG. 2(b), the outward deflection amount at an axial section that includes the major axis L1 of the ellipse gradually increases proportional to distance from the back end 31a to the opening end 31b, and as shown in FIG. 2(c), the inward deflection amount at an axial section that includes the minor axis L2 of the ellipse gradually increases proportional to distance from the back end 31a to the opening end 31b. Therefore, the deflection amount of the external teeth 34 formed on the outer peripheral surface portion on the opening end 31b side also gradually increases from the back end portion 34a to the front end portion 34b in the tooth trace direction thereof, proportional to distance from cylindrical body back end 31a.

(Method of Forming Tooth Profile in Main Cross-section)

Figure 3:
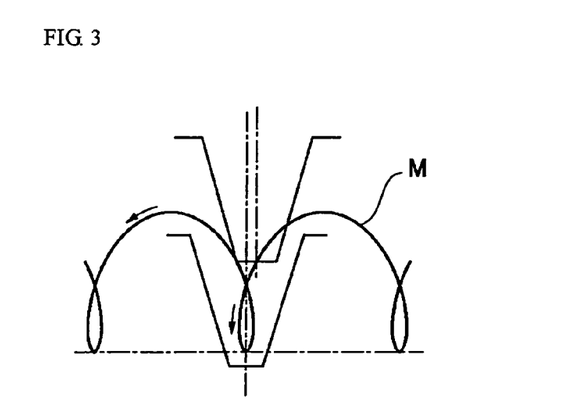
FIG. 3 is the moving path of a rack in a case in which the basis of the tooth profile formation of the present invention is κ>1.

FIG. 3 is a diagram showing the moving path of the teeth of the flexible external gear 3 with respect to the rigid internal gear 2, obtained in a case in which the relative movement of the two gears 2, 3 of the wave gear drive 1 are rack-approximated. Taking the cross-section perpendicular to the axis of the front end portion 34b of the opening side as the main cross-section constituting the basis of the formation of the tooth profiles of the two gears (cross-section perpendicular to the axis at a prescribed selected location in the direction of the tooth trace of the external teeth 34 of the flexible external gear 3), this moving path M is that which is obtained in this main cross-section. The moving path M of the teeth of the gear 3 is given by the following equation.

$$x = 0.5\ mn(\theta - \kappa \sin \theta)$$

$$y = \kappa mn(1 - \cos \theta)$$

Here, $\kappa$ is a flexing coefficient that is greater than "1", m is module. In addition, the total amplitude of the moving path M of the flexible external gear 3 is 2 $\kappa$mn.

Figure 4:
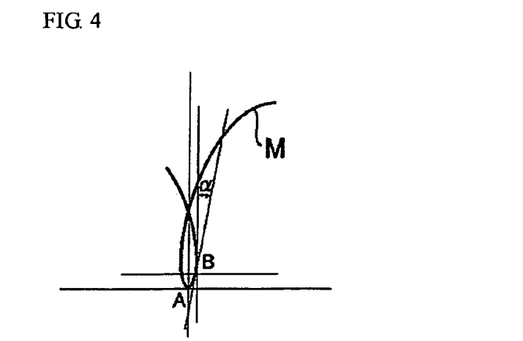
FIG. 4 is an explanatory diagram showing, among the moving paths of FIG. 3, the utilization range for tooth profile formation.

FIG. 4 is an explanatory diagram showing the utilization range set in the loop part of the tooth moving path M. The curved portion AB is used that is from point A of the deepest engaged part to a meshing departing part to point B at an angle $\alpha$ from the deepest position point A at which the angle of inclination (pressure angle) of a tangent of the moving path M formed with respect to the y axis (radial line of the rigid internal gear) is 90°. This angle $\alpha$ corresponds to the minimum pressure angle of the deddendum, in the case of the flexible external gear, and of the addendum, in the case of the rigid internal gear, of the obtained tooth profile; generally the range of angle $\alpha$ is 0°<$\alpha$<30°, and practically is 0°<$\alpha$<15°. This curved portion AB is used to obtain the tooth profile, as described below. With an engagement with a positive deflection ($\kappa$>1), a tooth of the flexible external gear 3 that enters a tooth space of the rigid internal gear 2 does not contact as far as the deepest position A, and first contacts the tooth face of the internal gear 2 as it disengages on the departing side.

Figure 5:
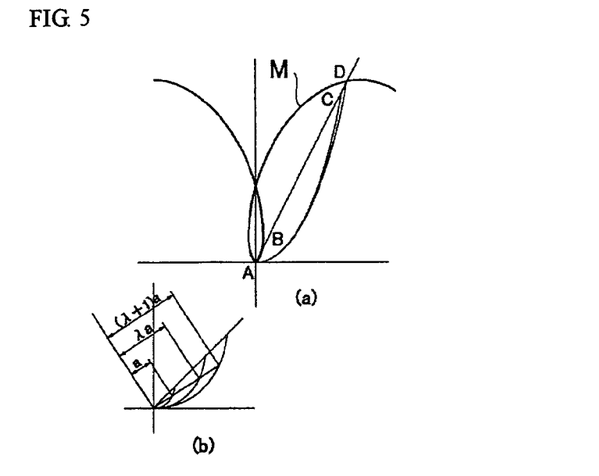
FIG. 5 is an explanatory diagram showing an example of the tooth profiles set for the two gears.

Next, as shown in FIG. 5 (a), the working range of the moving path, that is, the curved portion AB multiplied by $\lambda$ to obtain a first similar curve AC is employed as the tooth profile of the flexible external gear 3. Also, the curved portion AB multiplied by ($\lambda$+1) to obtain a second similar curve AD is employed as the tooth profile of the rigid internal gear 2. As shown by the principle of the two tooth profiles thus set, shown in FIG. 5 (b), from their similarity, continuous meshing is possible between the curved portions AB.

Here, it is necessary to make the tooth depth as large as possible in order to increase the ratcheting torque. To do this, $\lambda$ is made as large as possible. The maximum value thereof is the position to which the addendum of the rigid internal gear 2 comes on the moving path M. If it is made larger there is interference between the addenda of the two gears. FIG. 5 (a) shows this case. The extreme value of the maximum value of $\lambda$ is a case in which the addendum of the rigid internal gear is selected as the location of the maximum amplitude of the moving path M.

That is, the theoretical value of the angle $\alpha$ (pressure angle) relating to the extreme value of the maximum value of $\lambda$ can be obtained from the following equation.

$$\tan \alpha = 0.5(1 - \kappa \cos t)/(\kappa \sin t)$$

Here, the enlargement ratio ($\lambda$+1) of the moving path M will be the following value.

$$\lambda + 1 = 2\ \kappa mn/\kappa mn/(1 - \cos t) = 2/(1 - \cos t)$$

Also, the value of t is a value that can be obtained from the following equation.

$$t - \kappa \sin t + 0.5\pi \cos t - 0.5\pi = 0$$

As an example, if flexing coefficient, then $\kappa$=1.4, t=26.1272°, $\alpha$=11.7712°, $\lambda$=18.5730.

(Tooth Profile of a Cross-sectional Position Perpendicular to the Axis Other than the Main Cross-section)

The foregoing explanation relates to the main cross-section of the flexible external gear 3, that is, to a method of forming a tooth profile in the front end portion 34b on the opening side. A tooth profile may be formed as follows to maintain effective meshing in a cross-section perpendicular to the axis other than the main cross-section.

Figure 6:
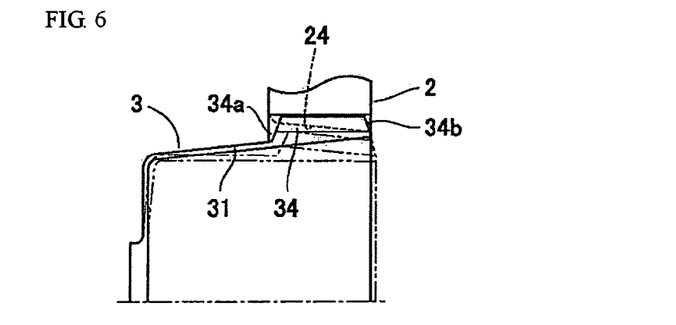
FIG. 6 is an explanatory diagram showing the tooth shape of the two gears employed to realize effective meshing other than at the main cross-section.

First, in the flexible external gear 3, the front end portion 34b on the opening side having a deflection amount 2 $\kappa$mn ($\kappa$>1, positive deflection) is set as the main cross-section, and the deflection amount of the major axis of the elliptical rim neutral line in the back end portion 34a in the direction of the tooth trace of the flexible external gear 3 is set at 2 kmn ($\kappa$<1, negative deflection). Also, to enable meshing to be maintained at each cross-section in the direction of the tooth trace from the front end portion 34b on the opening side to the back end portion 34a, as shown in FIG. 6, the flexible external gear 3 is formed as a equal-depth-tooth conical gear with the minor diameter facing towards the front end portion 34b. Also, as the spur gear of the rigid internal gear 2, to prevent addendum interference by decreasing the amplitude of the moving path M of the flexible external gear 3 towards the back end portion 34a, the shape of the tip cylinder surface thereof is formed as a conical surface with the major diameter facing towards the back end portion 34a of the flexible external gear 3. Moreover, in the cross-section perpendicular to the axis that includes the major axis of the wave generator 4, the generator of the addendum cone of the rigid internal gear 2 is set to follow the tooth bottoms of flexible external gear 3. Also, in FIG. 6, the imaginary lines show the state before deformation, and the solid lines show the deformed state at an axial section that includes the major axis, after deformation.

Figure 7:
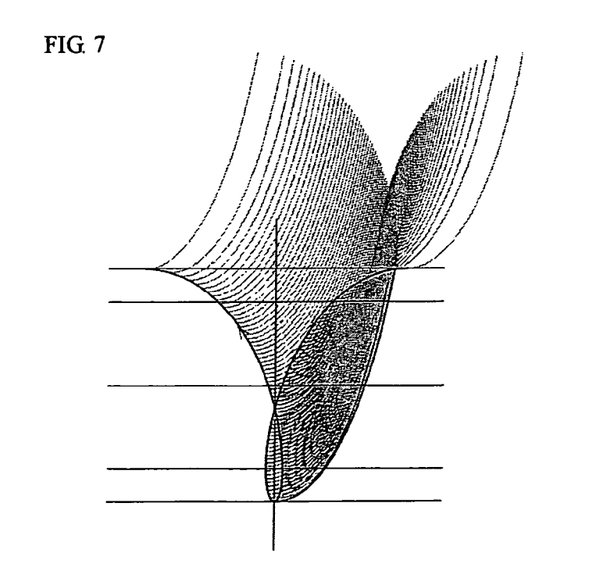
FIG. 7 is an explanatory diagram showing meshing in a cross-section perpendicular to the axis of the front end portion on the opening side of the tooth trace of the two gears.
Figure 8:
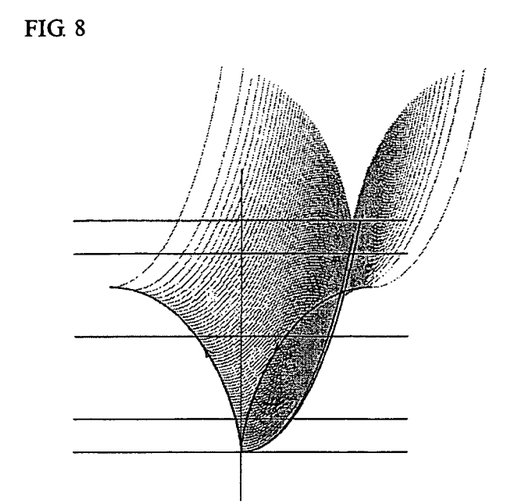
FIG. 8 is an explanatory diagram showing meshing in a cross-section perpendicular to the axis in the center of the tooth trace of the two gears.
Figure 9:
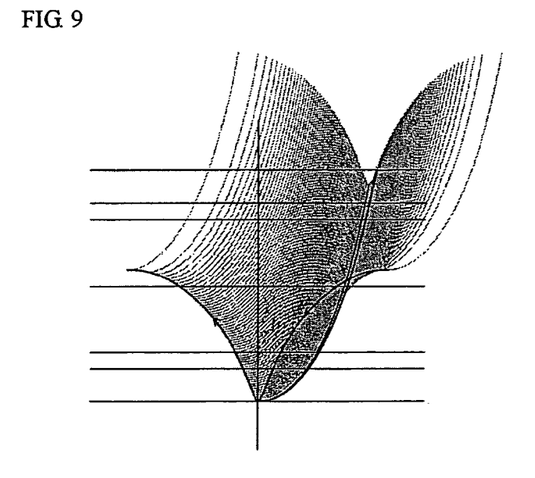
FIG. 9 is an explanatory diagram showing meshing in a cross-section perpendicular to the axis in the back end portion of the tooth trace of the two gears.

FIG. 7 to FIG. 9 show rack-approximated relative movement of the teeth of the flexible external gear 3 with respect to a tooth of the rigid internal gear 2. FIG. 7 shows the state of meshing of the front end portion 34b on the opening side that is the main cross-section, FIG. 8 shows the same meshing state in the vicinity of the center of the tooth trace of the flexible external gear 3, and FIG. 9 shows the same meshing state in the back end portion 34a thereof. As can be understood from the figures, the moving path that shows tooth progress from the front end portion on the opening side to the back end portion, changes from a loop shape to a conical shape, via a cusp-shape. Along with this, from the meshing in the latter half of the loop past the major axis, the tooth meshing region also changes, going via the meshing in the vicinity of the major axis cusp to meshing prior to the major axis.

As described in the foregoing, the meshing of the back end portion 34a of the flexible external gear 3 is pre-stage meshing up to the position of the major axis of the flexible external gear 3 flexed into an ellipse, and differs from post-stage meshing from past the position of the major axis at the front end portion 34b thereof. This signifies that wide-area meshing is realized on either side of the major axis position, which previously has not been seen. In the portion from the front end portion 34b to the back end portion 34a, meshing is intermediate transitional meshing that includes pre-stage meshing and post-stage meshing.

Figure 10:
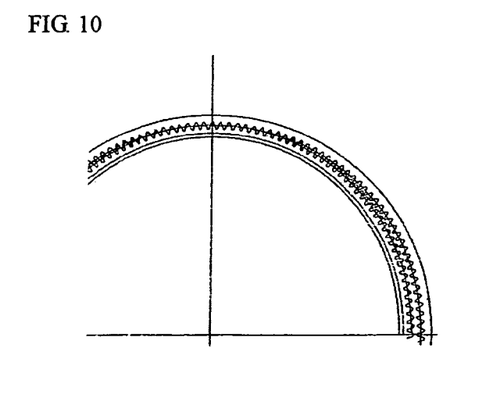
FIG. 10 is a developed view of meshing in a cross-section perpendicular to the axis in the front end portion on the opening side of the tooth trace of the two gears.
Figure 11:
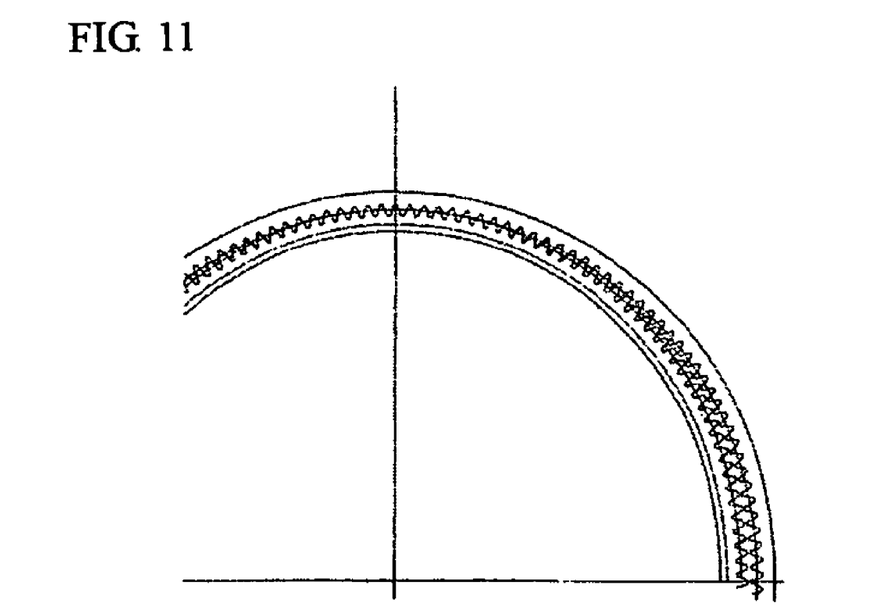
FIG. 11 is a developed view of the meshing in a cross-section perpendicular to the axis in the center of the tooth trace of the two gears.
Figure 12:
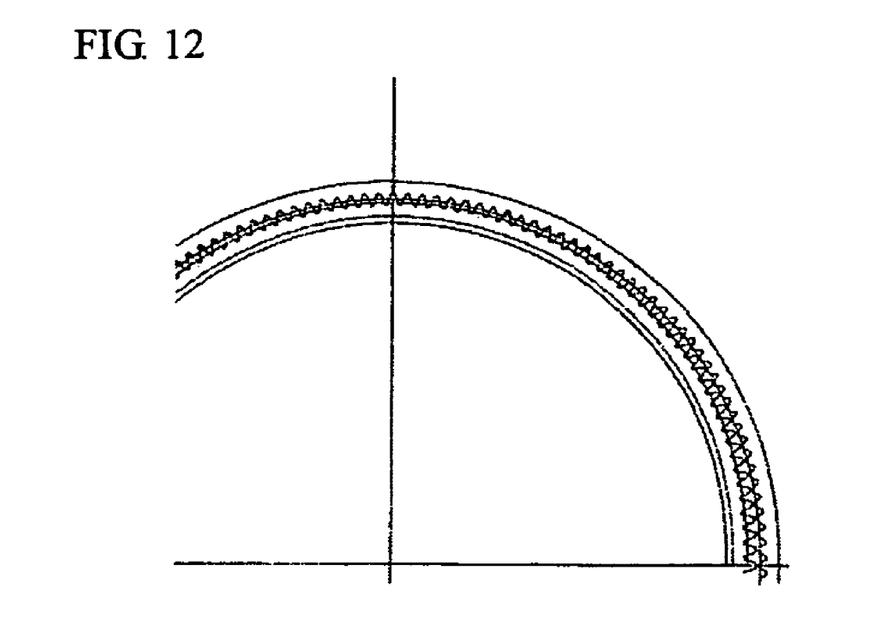
FIG. 12 is a developed view of meshing in a cross-section perpendicular to the axis in the back end portion of the tooth trace of the two gears.

Also, FIG. 10 shows a developed view of the post-stage meshing after passing the position of the major axis in the front end portion 34b, in a case in which the tooth depth of the two gears has been maximized. FIG. 11 is a developed view of the meshing in a cross-section in the vicinity of the center of the tooth trace, showing intermediate meshing in the vicinity of the major axis, and FIG. 12 is a developed view of pre-stage meshing up to the major axis position in the back end portion 34a, in the tooth trace direction. Each of these is a case in which there is a limited number of teeth (the number of teeth of the flexible external gear is 160, the number of teeth of the rigid internal gear is 162), in which addendum modifications are performed on the tooth profile of the flexible external gear 3 to ensure smooth meshing of the two gears 2, 3.

EXPLANATION OF SYMBOLS

1 Wave gear drive
2 Internal gear
3 External gear
31a Back end
31b Opening end
34 External teeth
34a Back end portion in direction of tooth trace
34b Front end portion in direction of tooth trace
4 Wave generator
M Moving path
AB Curved portion used to set tooth profile
AC First similar curve
AD Second similar curve
A Deepest position of moving path
B Point at which inclination angle of tangent on the moving path is α

The invention claimed is:

1. A wave gear drive having a circular rigid internal gear, inside which a flexible external gear is disposed, inside which a wave generator is inserted, the flexible external gear having a flexible cylindrical body and an annular diaphragm that extends in a radial direction from a back end of the cylindrical body, a tooth portion formed on an opening end side region of the cylindrical body being flexed into an elliptical shape by a deflection amount generated by the wave generator from a back end portion on the diaphragm side to a front end portion on the opening end side thereof that is approximately proportional to distance from the diaphragm;
wherein:
the rigid internal gear is a spur gear of module m;
the flexible external gear is a spur gear of module m or a conical gear of module m at the front end portion thereof;
a number of teeth of the flexible external gear is 2n (n being a positive integer) fewer than a number of teeth of the rigid internal gear;
the deflection amount of the major axis of the elliptical rim neutral line of the flexible external gear at a cross-section of the flexible external gear perpendicular to the axis at an arbitrarily selected location in the direction of the tooth trace thereof (hereinafter referred to as main cross-section) is set as 2 κmn(κ>1);
the meshing of the teeth of the rigid internal gear and flexible external gear in the main cross-section is approximated as rack meshing and the moving path of the teeth of the flexible external gear with respect to the teeth of the rigid internal gear that accompanies rotation of the wave generator obtained;
from the main axis to a tooth departing side in the moving path, employing a curved portion from a deepest engaged position of the two gears at which an inclination angle of a radial line to the moving path of the rigid internal gear is 90° to the position at which the inclination angle is α(0°<α<30°);
employing as a tooth profile of the flexible external gear a first similar curve obtained by enlarging the curved portion by λ times; and
employing as a tooth profile of the rigid internal gear a second similar curve obtained by enlarging the curved portion by (λ+1) times.

2. The wave gear drive in claim 1,
wherein the value of λ is set so that an apex of the second similar curve obtained by multiplying the curved portion as an origin of the deepest engaged position by (λ+1) times is positioned on the moving path.

3. The wave gear drive in claim 1,
wherein the value of λ is set so that an apex of the second similar curve obtained by multiplying the curved portion as an origin of the deepest engaged position by (λ+1) times is positioned at the maximum amplitude point of the moving path.

4. The wave gear drive in claim 1,
wherein the main cross-section is a cross-section perpendicular to the axis of the front end portion in the direction of the tooth trace of the flexible external gear,
a deflection amount of the back end portion in the direction of the tooth trace of the flexible external gear is set at 2 κmn(κ<1), and
the flexible external gear is a constant-height-teeth conical gear with a minor diameter facing towards the front end portion.

5. The wave gear drive in claim 4,
wherein, at the axial section that includes the major axis of the flexible external gear after deformation of the flexible external gear, a tip cylinder surface of the flexible external gear is shaped as a conical surface so that the addenda of the flexible external gear follow tooth bottoms of the rigid internal gear,
with the shape of the tip cylinder surface of the rigid internal gear being formed as a conical surface having an inside diameter that gradually increases from the front end portion to the back end portion in the tooth trace direction.

6. The wave gear drive in claim 1,
wherein the rigid internal gear and the flexible external gear each have a number of teeth that is 160 or more.

7. The wave gear drive in claim 2,
wherein the main cross-section is a cross-section perpendicular to the axis of the front end portion in the direction of the tooth trace of the flexible external gear,
a deflection amount of the back end portion in the direction of the tooth trace of the flexible external gear is set at 2 κmn(κ<1), and
the flexible external gear is a constant-height-teeth conical gear with a minor diameter facing towards the front end portion.

8. The wave gear drive in claim 3,
wherein the main cross-section is a cross-section perpendicular to the axis of the front end portion in the direction of the tooth trace of the flexible external gear,
a deflection amount of the back end portion in the direction of the tooth trace of the flexible external gear is set at 2 κmn(κ<1), and
the flexible external gear is a constant-height-teeth conical gear with a minor diameter facing towards the front end portion.

9. The wave gear drive in claim 2,
wherein the rigid internal gear and the flexible external gear each have a number of teeth that is 160 or more.

10. The wave gear drive in claim 3,
wherein the rigid internal gear and the flexible external gear each have a number of teeth that is 160 or more.

11. The wave gear drive in claim 4,
wherein the rigid internal gear and the flexible external gear each have a number of teeth that is 160 or more.

12. The wave gear drive in claim 5,
wherein the rigid internal gear and the flexible external gear each have a number of teeth that is 160 or more.

* * * * *